United States Patent [19]

Trottier et al.

[11] Patent Number: 4,757,446
[45] Date of Patent: Jul. 12, 1988

[54] HIGH-SPEED LINK FOR CONNECTING PEER SYSTEMS

[75] Inventors: Robert R. Trottier, Lowell; David A. Reeder, North Billerica, both of Mass.

[73] Assignee: Wang Laboratories, Inc., Lowell, Mass.

[21] Appl. No.: 847,086

[22] Filed: Apr. 1, 1986

[51] Int. Cl.$^4$ .................. G06F 13/14; G06F 13/36
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,810,114 | 5/1974 | Yamada et al. | 364/200 |
| 3,995,258 | 11/1976 | Barlow | 364/200 |
| 4,381,542 | 4/1983 | Binder | 364/200 |
| 4,408,300 | 10/1983 | Shima | 364/900 |
| 4,467,418 | 8/1984 | Quinquis | 364/200 |
| 4,494,192 | 1/1985 | Lew | 364/200 |

Primary Examiner—David Y. Eng
Attorney, Agent, or Firm—Michael H. Shanahan; Gordon E. Nelson

[57] ABSTRACT

A high speed link used to connect peer computer systems. The link includes data lines and control lines connected to a device adapter in the I/O system of each of the peer computer systems and logic in each device adapter. The data lines carry data words in parallel; the control lines include status lines indicating status of each of the peer systems, arbitration lines for indicating which of the peer systems currently desires to transmit data across the link and whether the link is available, and receiver acquisition lines for specifying which of the peer systems is to receive a transmission and whether the specified system is able to receive the transmission. The logic in the device adapter includes status logic responsive to the status lines for inhibiting a transmission when the receiving peer system is not ready, arbitration logic responsive to the arbitration lines for deciding which peer system may have access to the link at any given time, and receiver acquisition logic permitting the transmitting device adapter to specify the receiving system, permitting the receiving device adapter to return its address and acknowledge its selection, and permitting the transmitting device adapter to verify the selection and determine whether the receiving system is able to receive data.

6 Claims, 10 Drawing Sheets

HIGH-SPEED LINK FOR CONNECTING PEER SYSTEMS

FIELD OF THE INVENTION

The present invention relates to data processing systems and more particularly to systems for linking component systems together to form a data processing system.

DESCRIPTION OF THE PRIOR ART

In the prior art, parallel buses have generally been used to connect components of a single computer system and serial links have been used to link peer systems together. The parallel bus has offered high speed, but has generally presumed that at least some of the connected components were not peers, i.e., were required in order for the system to operate at all. The serial link has been used to connect peer systems, and consequently could operate as long as any of the systems connected to it was operable. Data transmission over a serial link is, however much slower than over a parallel bus. What is needed, and what is provided by the present invention is a link which offers the high speed typical of the bus together with the peer relationship of the components typical of the serial link.

SUMMARY OF THE INVENTION

The present invention relates to links for connecting components of computer systems. The invention is a high-speed link for connecting a plurality of peer component systems. Each component system includes an input-output system. The link is connected to each input-output system and includes data lines and control lines. Included in the control lines are the following types: system status lines showing status of all connected component systems to each component system, arbitration lines for indicating whether the high-speed link is currently in use and which of the connected component systems wishes to commence transmission, and receiver acquisition lines for specifying which of the component systems is to receive the transmission and whether the specified component system is able to receive it.

The link further includes a device adapter in each input-output system connected to the data and control lines. In the device adapter are included the following: system status detection logic connected to the status lines for inhibiting transmission of data to a component system which is not ready therefor, arbitration logic connected to the arbitration lines for determining whether a component system may have access to the link at any given time, receiver acquisition logic connected to the receiver acquisition lines whereby a transmitting input-output system may specify a receiving input-output system, the specified system may acknowledge its selection and ability to receive, and the transmitting system may verify that the specified system has been selected and is able to receive data, data providing logic responsive to the receiver acquisition logic for providing data to the data lines after selection of a receiving system has been verified and data receiving means in the receiving system responsive to the receiver acquisition logic for receiving data from the data lines.

It is thus an object of the invention to provide improved means for linking computer systems;

It is a further object of the invention to provide a high-speed link for peer systems;

It is another object of the invention to provide a high-speed link connecting peer systems wherein each system may determine the status of the others.

It is an additional object of the invention to provide a high-speed link wherein a transmitting system may verify that it has the specified receiving system and that the receiving system can receive the data before commencing a transmission.

Other objects and advantages of the present invention will be understood by those of ordinary skill in the art after referring to the detailed description of a preferred embodiment contained herein and to the drawings, wherein:

Figure 1:
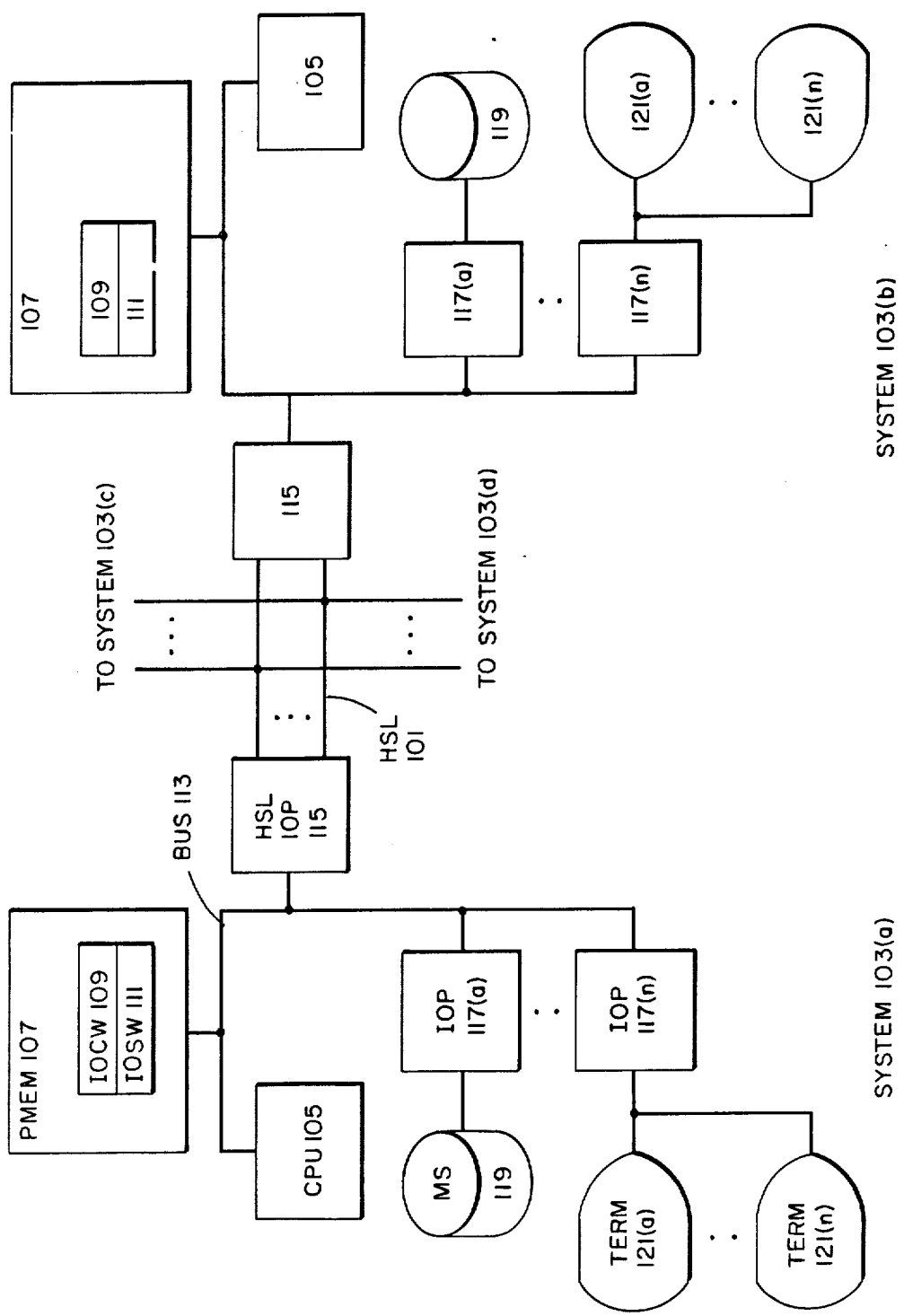
FIG. 1 is a block diagram of peer systems employing the present invention.

Reference numbers in the figures have three or more digits. The two least-significant digits are reference numbers within a drawing; the more significant digits are the drawing number. For example, the reference number 1003 refers to time 3 in drawing 10.

DESCRIPTION OF A PREFERRED EMBODIMENT

The following Description of a Preferred Embodiment will first describe the system of peer computer systems in which the present invention is employed, then describe the signals and timing in the HSL in detail, and finally describe an I/O processor which operates the HSL in detail.

1. System in which the HSL is employed: FIG. 1

A preferred embodiment of the HSL is employed in the loosely-coupled computer system shown in FIG. 1. Loosely-coupled system 102 of that figure is composed of up to 4 stand-alone computer systems 103, each one of which functions as a peer system. Each computer system 103 includes a CPU 105, a physical memory (PMEM 107), and a set of I/O processors (IOPs) 117. Each IOP is connected to one or more input/output devices. Shown in FIG. 1 are a mass storage device (MS) 119 connected to IOP 117(a) and a group of terminals (TERM) 121 connected to IOP 117(n). The number of IOPs 117 may vary in a system 103, as may the type and number of I/O devices attached to an IOP 117. The IOPs 117, CPU 105, and PMEM 107 are connected by means of system bus 113. Both CPU 105 and individual IOPs 117 have direct access to PMEM 107 via bus 113.

System 103 in preferred embodiment is a multiprocess system. Operations performed by a system 103 are performed for the process which is presently executing on CPU 105. When system 103 performs an I/O operation for a process, CPU 105 places an I/O command word (IOCW) 109 specifying the operation at a location in PMEM 107 known to the IOP 117 which must perform the operation, signals the IOP 117 that it has an operation to perform, and ceases executing instructions for the process that requested the operation until the I/O operation is complete. While the I/O operation is being completed, the process is barred from CPU 105 and CPU 105 executes instructios for another process.

IOP 117 responds to the signal from CPU 105 by retrieving IOCW 109 from PMEM 107 and performs the operation specified therein, referencing PMEM 107 directly as required to read data from PMEM 107 to an I/O device or to write data from the I/O device to PMEM 107. When the operation is complete, IOP 117 places an I/O status word (IOSW) 111 indicating the status of the operation at a special location in PMEM 107 and signals an interrupt to CPU 105. CPU 105 responds to the interrupt by executing system interrupt code which examines IOSW 111 to determine the outcome of the operation and then performs the processing required to permit the process for which the I/O operation was performed to resume execution on PCU 105. In a preferred embodiment, systems 103 may be VS computer systems manufactured by Wang Laboratories, Inc.

Loosely-coupled system 102 may consist of up to four VS computer systems of the types VS 85, VS 90, VS 100, or VS 300. Different models may be combined in the same system 102.

Figure 3:
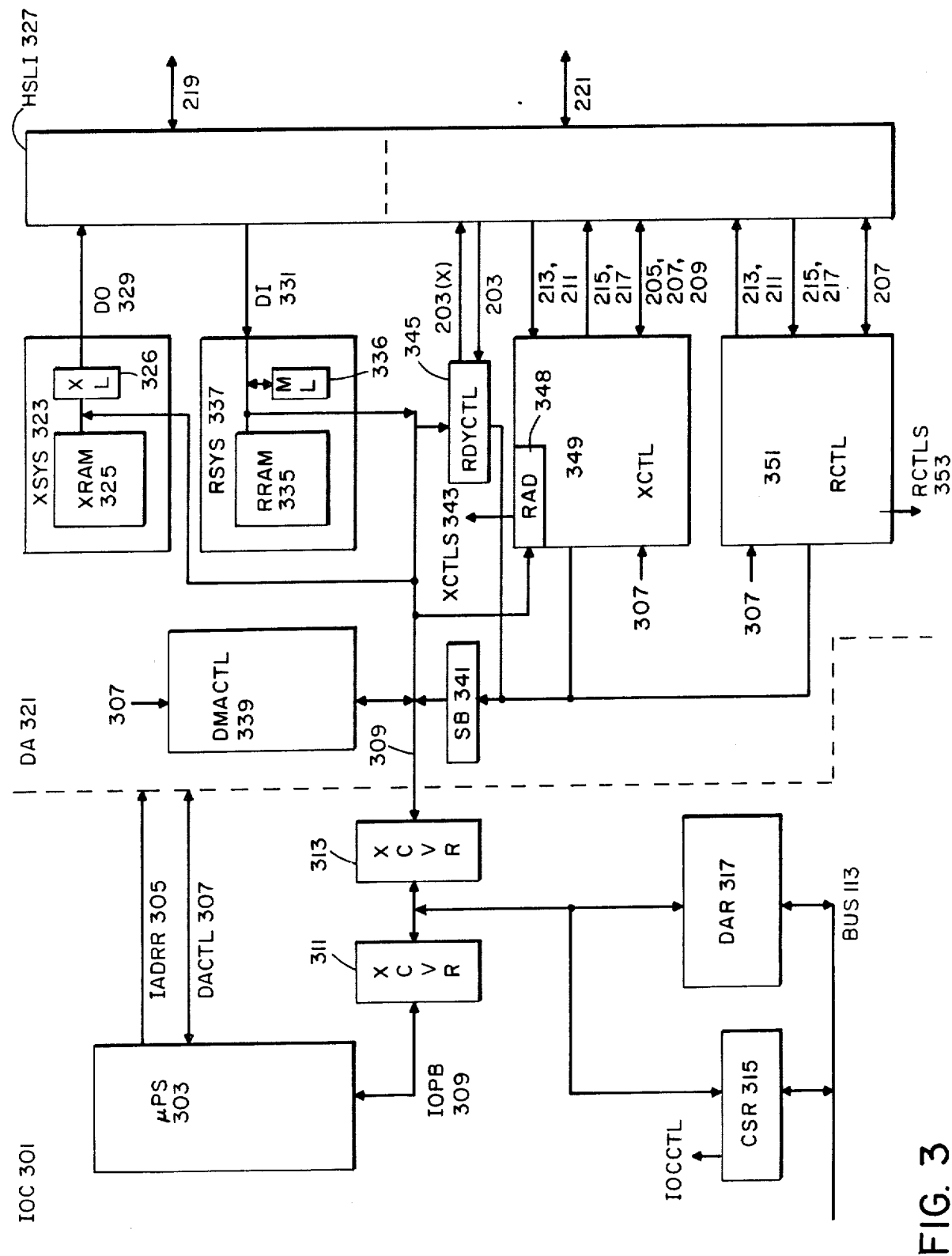
FIG. 3 is an overview block diagram of an I/O system employing the high-speed link of the present invention.

When systems 103 is part of loosely-coupled system 102, one IOP, shown in FIG. 3 as HSL IOP 115, is specally adapted to be connected to HSL 101 connecting the given system 103 to up to three other systems 103. Since HSL 101 is connected to an IOP, a given system 103 can transfer data to and receive data from another system 103 in exactly the same fashion as it transfers data to and receives data from any other I/O device.

Figure 2:
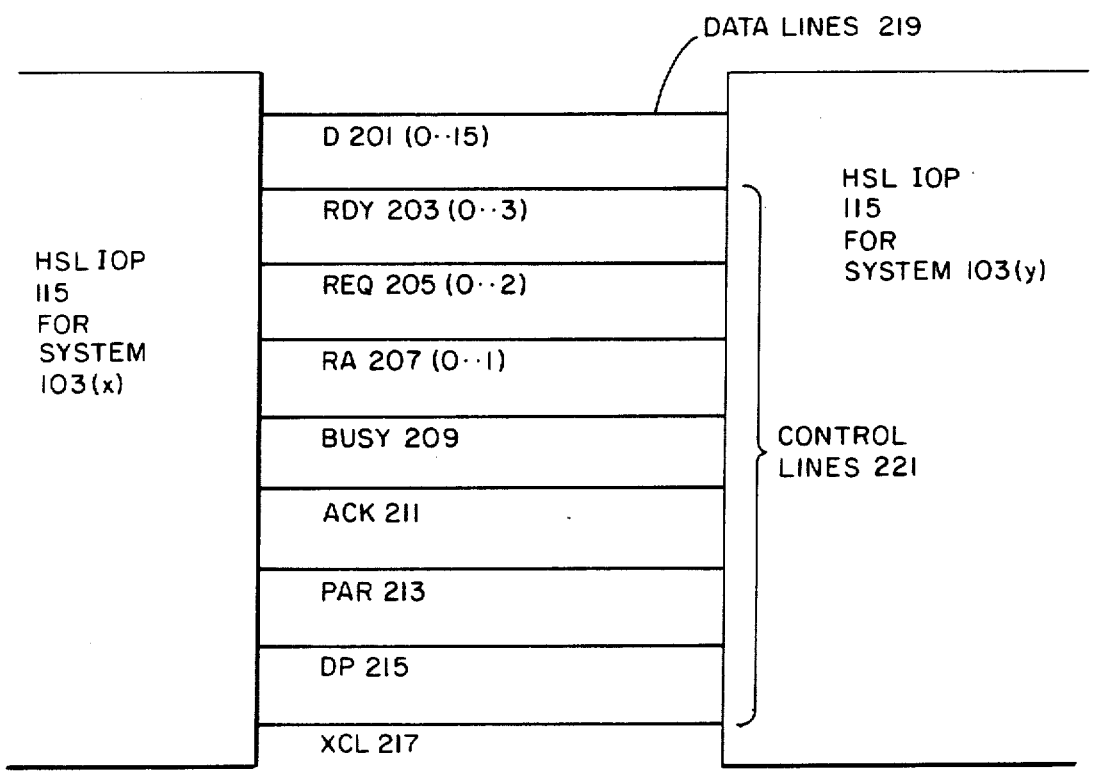
FIG. 2 is a detailed logical diagram of the high-speed link of the present invention.

2. Detailed Description of HSL 101: FIG. 2

Continuing with a detailed description of HSL 101, FIG. 2 presents a high-level overview thereof. HSL 101 consists of 30 logical lines connecting system 103(x), which is transmitting data, and system 103(y), which is receiving data. Any system 103 connected to HSL 101 may use HSL 101 to either transmit or receive data.

The 30 logical lines are subdivided into 16 data lines D 201(0..15), making up data lines 219, and 14 control lines 221. All lines are bidirectional. The 16 data lines are used to transfer packets consisting of a 16-bit message word followed by a sequence of 16-bit data words between system 103(x) and 103(y). The message word contains the HSL address of system 103(x) and the nubmber of data words in the transmission.

Control lines 221 may be subdivided into the following functional groups: the system status lines, the HSL arbitration lines, the receiver acquisition lines, the parity lines, and the clock line. The system status lines are RDY 203(0..3). Each of these lines corresponds to one system 103 connected to HSL 101 and indicates whether that system 103 is ready to receive data. The HSL arbitration lines are REQ 205(0..2) and BUSY 209. These lines provide signals which determine which HSL IOP 115 will use HSL 101 next and which seize the bus for that IOP 115. The receiver acquisition lines are RA 207, which provides the address of the receiving HSL IOP 115 to the receiver and receives the confirmation of that address from the receiver and ACK 21, which first indicates that the receiver has received the request and then indicates whether the receiver is in condition to receive data.

The parity lines, DP 215 and PAR 213 permit parity checking to ensure that no error occurred in transmission of data and message words across HSL 101. The clock line, XCL 217, finally, carries timing signals which control the setting up of a transmission and the transmission of the data and message words. RDY 203(0..3): These lines are ready lines, one for each system 103 which may be connected to HSL 101. When a HSL IOP 115 for a system 103 is operating, that system 103's line in RDY 203 is high. Each system 103 sets its own RDY line and reads the other ready lines. If a system 103's ready line falls during a transmission to that system, the transmission is terminated.

REQ 205(0..2): These are lines by which systems 103 request use of HSL 101 for transmitting data. Each request line is assigned to one of the systems 103, and the line's number determines the system 103's access priority for HSL 101. If two systems 103 attempt to transmit data on HSL 101 at the same time, the one with the highest access priority is given access to HSL 101 and the other is excluded. The system 103 having REQ O has the highest priority, the system with REQ 1 the next, and so on. The lowest priority belongs to the system 103 whch does not have a REQ line 205, and that system 103 may begin transmitting data on HSL 101 only when no other system 103 is requesting use of HSL 101.

BUSY 209 is received by all systems 103. The line indicates whether HSL 101 is currently in use and if it is, inhibits other systems 103 from starting transmission.

RA 207(0..1): These lines carry addresses of systems 103 on HSL 101. In a preferred embodiment, there is a maximum of four systems 103, and consequently, addresses can be expressed in two bits. After a transmitting system 103(x) has gained access to HSL 101, but before receiving system 103(y) has accepted anything on data lines 219, it sets RA 207(0..1) to the address of the receiving system 103(y). System 103(y) responds to RA 207 specifying its address by putting its own address on RA 207. System 103(x) then compares the address it receives on RA 207 with the address it originally specified, and if they differ, system 103(x) abandons the attempt to transmit.

ACK 211 carries acknowledgements from from receiving systems 103(y) to transmitting system 103(x). Receiving system 103(y) sets ACK 211 acknowledging that it has been selected at the same time that it sends its address on RA 211. If receiving system 103(y) cannot receive data, it later resets ACK 211. Transmitting system 103(x) samples ACK 211 twice before beginning to transfer data. The first time, it samples to make sure that ACK 211 has been set; the second time, it samples to make sure that ACK 211 has not been reset.

DP 215 transmits the odd parity value for the message or data word currently being sent on data lines 219 from system 103(x) to system 103(y). System 103(y) checks the parity of the message or data word it has received with the parity value it received for the word via DP 215. If the two do not agree, system 103(y) sets PAR 213. When system 103(y) sets PAR 213, transmitting system 103(x) discontinues the transmission.

XCL 217 is a transmission clock signal which system 103(x) which has seized HSL 101 provides to all other systems 103. XCL 217's signals synchronize selection of a specific system 103(y) and following that, the transmission itself. In a preferred embodiment, the period of XCL 217 may be adjusted as required for HSLs 101 of various lengths.

HSL 101 is implemented physically as a 60-conductor flat twisted pair cable in which each twisted pair is a differential pair for one of the thirty logical lines described above. Systems 103 connected by HSL 101 are daisy-chained together, i.e., each system has a panel with two connectors for the cable. Connected to the connectors is piece of the cable with another connector at its center. This connector is connected to the system 103. In the first system 103, one panel connector receives a bus terminator and the other receives the cable to the second system 103. In the second system 103, the cable from the first system 103 is connected to one of the panel connectors and the cable to the third system 103 is connected to the other panel connector, and so forth. In a preferred embodiment HSL 101 may employ up to 160 total feet of cable to link systems 103 into a single system 102.

In other embodiments, XCL 217 may be adjusted to permit greater cable lengths.

Figure 4:
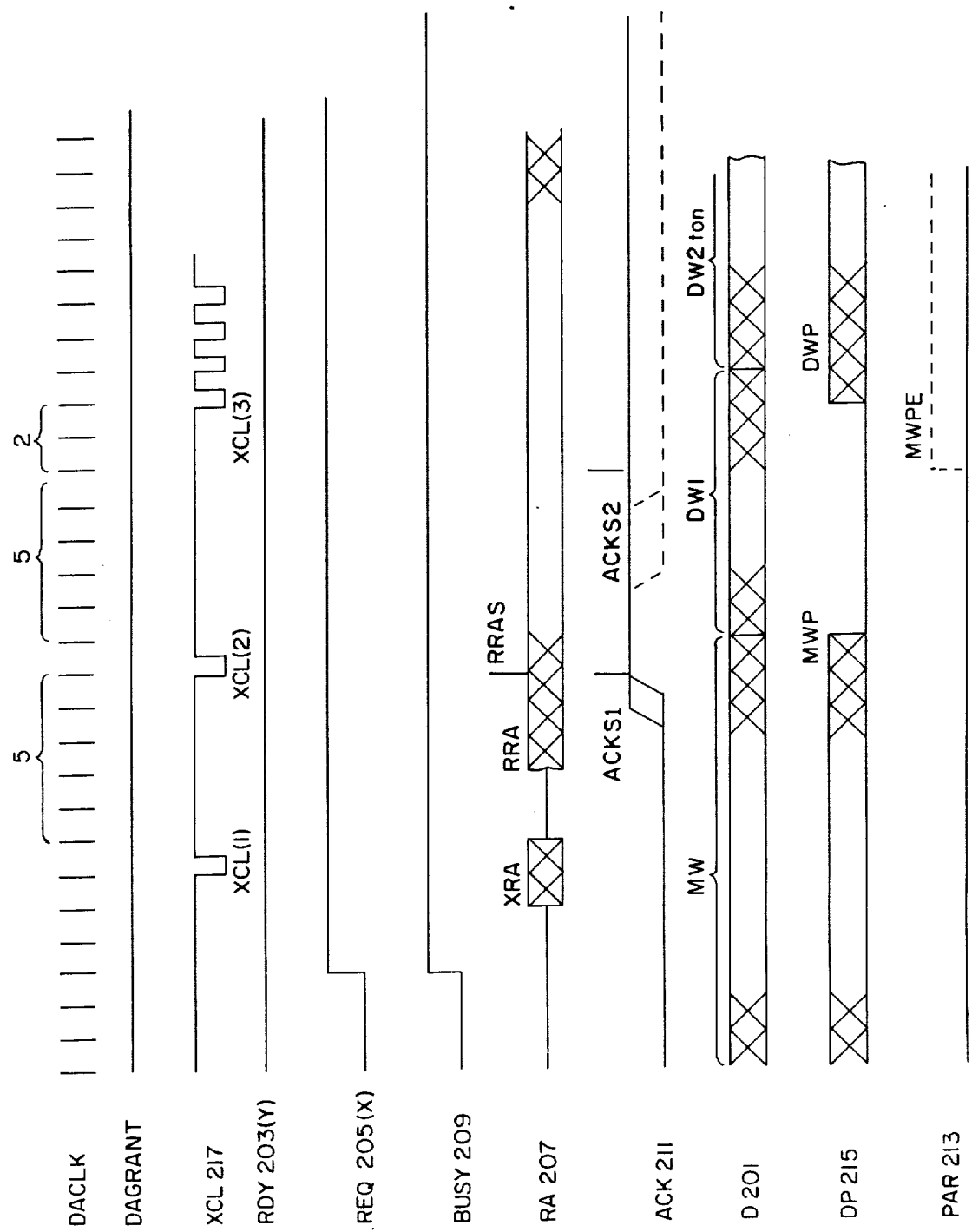
FIG. 4 is a timing diagram of the start of a transmission operation over the high-speed link.
Figure 5:
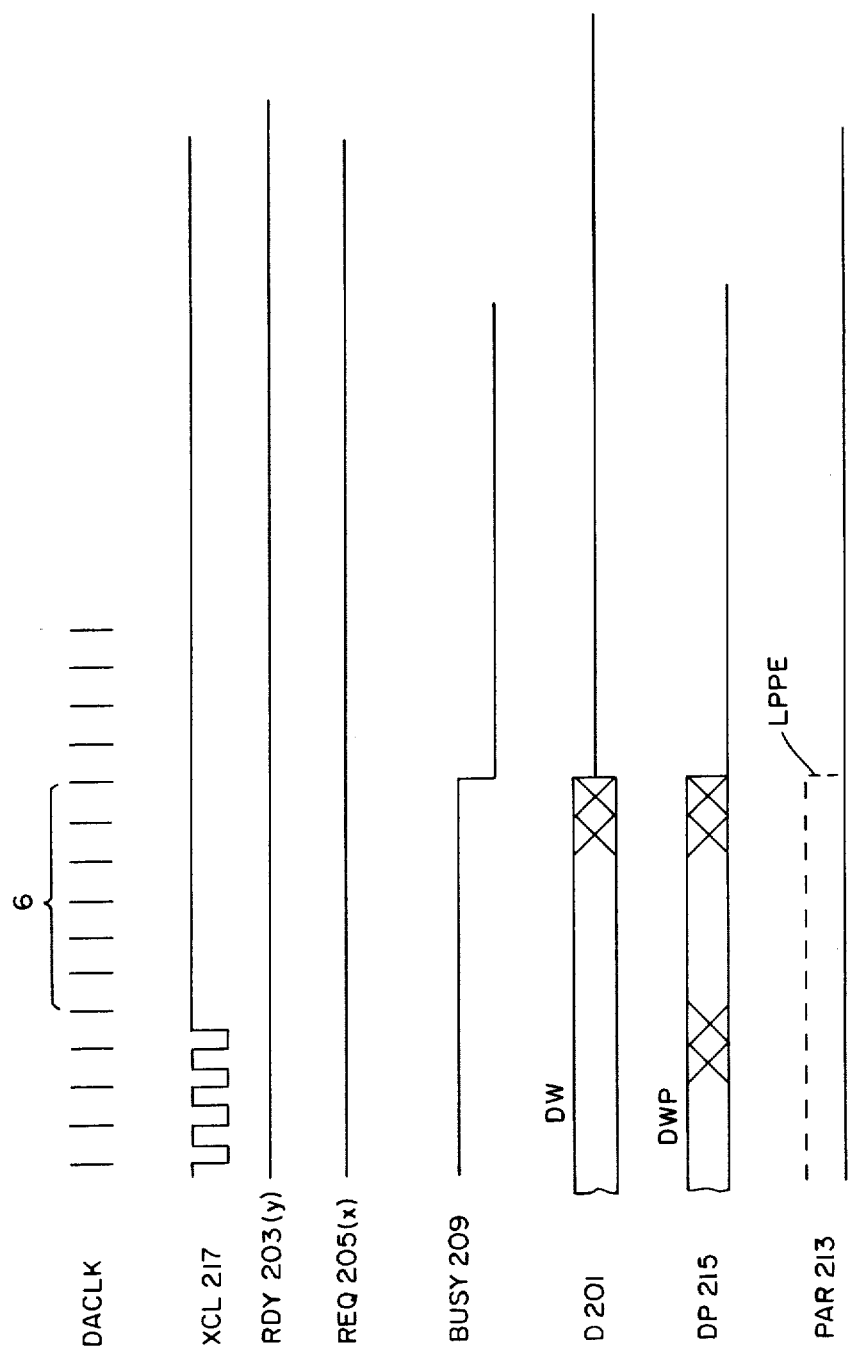
FIG. 5 is a timing diagram of the normal termination of a transmission operation over the high-speed link.

3. Operation of HSL 101: FIGS. 4 and 5

Operation of HSL 101 during a data transmission between system 103(x) and 103(y) will be described using the timing diagrams of FIGS. 4 and 5. FIG. 4 is a timing diagram of the start of a transmit operation. Beginning at the top, DACLK represents a clock signal internal to HSL IOP 115 for system 103(x), henceforth HSL IOP 115(x). XCL 217 is derived from DACLK, and it is DACLK whose period is adjusted as required by the length of HSL 101. DAGRANT is another signal internal to HSL IOP 115(x) which is produced by grant logic which determines from the values of REQ 205(0..2) and BUSY 209 whether system 103(x) may access HSL 101. As seen in FIG. 4, DAGRANT in a preferred embodiment goes high when system 103(x) has access. The remaining signals in the timing diagram are those carried on the lines of HSL 101.

Before starting a transmission, HSL IOP 115(x) checks whether RDY 203(y) for receiving system 103(y) is high. If it is, HSL IOP 115(x) sets REQ 205(x) for transmitting system 103(x) low, indicating a request from system 103(x). The grant logic responds to the states of BUSY 209 and the REQ 205 lines for the other systems 103. If BUSY 209 is low, indicating that HSL 101 is free and the REQ 205 lines indicate that system 103(x) has priority, the grant logic delays 8 DACLK periods to allow for propagation delay and then permits signal DAGRANT to go high. One DACLK period before DAGRANT goes high, system 103(x) puts the message word onto data lines 201. In response to DAGRANT, REQ 203(x) goes high and BUSY 209 goes high, seizing HSL 101 for system 103(x).

One DACLK interval after the bus has been seized, HSL IOP 115(x) gates the HSL address of receiving system 103(y) onto RA(0..1) 207. Two DACLK intervals later, HSL IOP 115(x) produces a pulse, XCL(1), on XCL 217. At the end of that DACLK interval, HSL IOP 115(x) ceases gating the address of system 103(y) onto RA 207. That address appears in FIG. 4 as XRA. In response to XCL(1), HSL IOP 115 of system 103(y), henceforth HSLIOP 115(y), reads RA 207, compares the address therein with its own address, and if they are the same, produces an internal receive enable signal, RCV EN on the next clock. In response to RCV, EN, HSLIOP 115(y) sends its own address (RRA in FIG. 4) on RA 207 and raises ACK 211, indicating that it has been selected to receive.

After sending XRA, HSL IOP 115(x) waits five DACLK intervals to permit time for XRA to propagate to HSL 115(y) and for RRA and the ACK signal to propagate back to HSL IOP 115(x). Thereupon, HSL IOP 115(x) produces XCL(2). In the next DACLK interval thereafter, it puts the first data word of the packet being transmitted onto D 201. At the same time, HSLIOP 115(x) samples RA 207 and ACK 211, as indicated by RRAS and ACKS1 respectively. HSL IOP 115(x) compares RRA with the address which it sent in XRA in the next DACLK cycle. If they are not the same or if ACK 211 is low, indicating that HSLIOP 115(y) is not empty and therefore cannot receive data, HSL IOP 115(x) terminates the transmission by lowering BUSY 209. If HSLIOP 115(y) can receive data, it responds to XCL(2) by clocking MW into a register.

If HSL IOP 115(x) has not terminated the transmission in response to RRA or ACK 211, it waits five DACLK intervals after XCL(2) in order to permit the signal on ACK line 211 to propagate back to HSL IOP 115(x). It then samples ACK line 211, and if it is low (shown in dashed lines in FIG. 4), terminates the transmission. If the transmission is not terminated, HSL IOP 115(x) produces XCL(3) and the following XCL pulses, one for each DACLK interval. Each pulse is accompanied by a data word on D 202, and HSL IOP 115(y) receives the data word in response to the XCL pulses.

As mentioned in the discussion of DP line 215, each time HSL IOP 115(x) transmits a message or data word, DP 215 indicates the word's parity. In a preferred embodiment, the indicated parity is odd. HSL IOP 115(y) receives the parity signal on DP 215 together with each transmitted word. HSL IOP 115(y) checks the parity of each received word and compares the result with the signal received on DP 215. If both do not show the same parity, HSL 115(y) raises PAR 213, and in response thereto, HSL IOP 115(x) terminates the transmission. In FIG. 4, the dotted lines on PAR 13 show a response to a parity error in MW, the message word.

Continuing with FIG. 5, that figure shows the timing for the termination of a transmission. Termination may be either because all of the data words in the packet have been transmitted or because RDY 203(y) went low or PAR 213 indicated an error. When the termination is normal, i.e., because all of the data words have been transmitted, XCL 217 ceases producing pulses after the last word sent prior to termination is on D 201. HSL IOP(x) then waits 6 DACLK pulses to ensure that the last word sent and DP 215 for the word have propagated to HSL IOP(y) and any signal on PAR 213 indicating a parity error has propagated back and lowers BUSY 209, releasing HSL 101. When the termination occurs because RDY 203(y) went low or PAR 213 indicated an error, BUSY goes high the next DACLK tick after the error is detected in HSL IOP(x).

4. Overview of HSL IOP 115: FIG. 3

In a preferred embodiment, HSL 101 is controlled by HSL IOP 115. FIG. 3 is a high-level block diagram of HSL IOP 115. HSL IOP 115 contains two main subsystems: I/O controller (IOC) 301, which controls operation of HSL IOP 115 and device adapter (DA) 321, which performs the actual transfer of data between HSL IOP 115 and PMEM 107. Beginning with IOC 301, IOC 301 has two main buses: bus 113, which connects it to PMEM 107 and CPU 105, and IOP bus 309, which connects it to DA 321. IOC 301 controls its own operation and that of DA 321 by means of microprocessor system (uPS) 303. Included therein are a microprocessor and the attendant program and data memories. uPS 303 is connected to IOPB 309 and can read and write the contents of other devices connected to IOPB 309. To read and write, uPS 303 provides addresses as indicated by IADDR 305. Information by which uPS 303 controls operations of DA 321 flows between uPS 303 and DA 321 by means of control signals (DACTL) 307 and by means of IOPB 309. IOPB 309 carries instructions from uPS 303 to DA 321 and status information from DA 321 to uPS 303.

Bus 113 is connected via DAR 317 to IOPB 309. DAR 317 contains registers used for transferring data between bus 113 and DA 321 and for addressing the locations in PMEM 107 which are the source or the destination of the data being transferred by IOP 115. The data transfer registers include separate sets for data received in IOP 115 and transmitted from IOP 115 and the address register includes logic for incrementing the address. XCVRs 311 and 313, which operate under control of uPS 303, permit data to be transferred between DAR 317 and uPS 303 or DA 321.

Control and status register (CSR) 315 contains three kinds of information: IOP control information, bus control information, and IOP status information. The IOP control information determines what operation IOP 315 is to perform and is received from IOCW 109 defining the operation. The bus control information is information by which CSR 315 controls operation of bus 113 when it is reading data from or transferring it to PMEM 107. The IOP status information indicates the current status of IOP 115. The information contained therein is provided at the end of an operation to IOSW 111.

Continuing with DA 321, DA 321 is connected by IOPB 309 to DAR 317 and uPS 303 and to HSL 101 by HSL interface (HSLI) 327, which, in a preferred embodiment, consists of differential drivers and receivers connected to the paired lines in HSL 101. In FIG. 3, HSLI 327 is divided into two halves, one for data lines 219 and the other for control lines 221. Connected to the half for data lines are transmit system (XSYS) 323 and receive system RSYS 337. XSYS 323 is connected to IOPB bus 309, whence it receives the data to be transmitted, and to DO 329, whereby it provides the data to HSLI 327. In XSYS 323, X latch (XL) 326 stores the next word to be put out to lines 219, while XRAM 325 stores the data words in a packet. XSYS 323 further contains an address counter used to generate addresses for XRAM 325 and a data word counter used to count the number of data words transferred from XRAM 325 to data lines 219. The data counter is loadable and readable by uPS 303.

RSYS 337 receives data from HSLI 327, to which it is connected by DI 331, and provides it to IOPB 309. In RSYS 337, message latch (ML) 336 receives and holds the message word with which a packet begins, while RRAM 335 stores the data words received in the packet. RSYS 337 has an address counter which is readable by uPS 303. XSYS 323 and RSYS 337 are separately controlled, and consequently, it is possible to load XRAM 325 from IOPB 309 while RRAM 335 is receiving data from DI 331 and vice-versa.

Direct memory access control (DMA CTL) 339 controls the transfer of data words between DAR 317 and XSYS 323 or RSYS 337 in response to signals of DACTL 307. Included in DMA CTL 339 is a counter which terminates a data transfer after a specified number of words have been sent or received. When data is being transmitted, the number comes from IOCW 109; when it is being received, it comes from the packet's message word. The separate control of XSYS 323 and RSYS 337 mentioned above makes it possible to perform a DMA operation on XRAM 325 or RRAM 335 while the other RAM is being used to transmit or receive data. uPS 303 sets the counter in DMACTL 339 and provides the signal which starts a transfer operation. SB 341 is a buffer which contains status information about DA 321 and is readable by uPS 303.

RDYCTL 345 reads RDY 203 lines from other systems 103 and sets the state of its own RDY 203 line. The values of the lines read by RDYCTL 345 are output to SB 341, while RDYCTL 345 sets its own RDY 203 line in response to an instruction received on IOPB 309 from uPS 303.

The parts of DA 321 which respond to and produce signals on control lines 221 are XCTL 349, which controls transmission of a packet, and RCTL 353, which controls reception of a packet. XCTL 349 and RCTL 351 are further responsive to signals in DACTL 307 and respectively produce XCTL signals XCTLS 343, which control XSYS 323, and RCTLS 353, which control RSYS 337. Arrows connecting XCTL 349 and RCTL 351 with HSLI 327 indicate which control lines affect operation of the respective component and whether the component produces signals on the lines, consumes them, or both. Thus, XCTL consumes RDY 203, ACK 211, and PAR 213, produces DP 215 and XCL 217, and both produces and consumes REQ 205, BUSY 209, and RA 207. XCTL 349 further includes RAD 348, a latch loadable from IOPB 309 which contains the address of the destination of a transmit operation.

5. Operation of HSL IOP 115

HSL IOP 115 performs a transmit operation in three steps: first, transmitting HSL IOP 115(x) determines whether receiving system 103(y) is ready and if it is, sets up the transmission. HSL IOP 115(x) next performs a DMA operation loading one packet of the data to be transmitted from PMEM 107 into XRAM 325. Finally, XCTL 349 zeizes HSL 101 and transmits the data. If more data is to be transmitted than is contained in one packet, the second and third steps are repeated until the specified amount of data has been transmitted.

Before HSL IOP 115 can begin operation, a program executing a system 103(x) must prepare an IOCW 109 for the operation at a special memory location known to HSL IOP 115 and execute a SIO (start I/O) instruction specifying system 103(y). In response to the SIO instruction, CPU 105 places a signal for IOP 115 and a value indicating the destination system on bus 113. In response to the signal, uPS 303 latches the value indicating the destination system into CSR 315 and then issues a command to bus 113 to fetch IOCW 109 from PMEM 107. IOCW 109 specifies the I/O operation, the address in PMEM 107 at which the data to be transferred is stored, the number of words in the data, and the HSL bus address of the destination. uPS 303 first reads SB 341 to determine whether destination system 103(y) is ready. If it is not, uPS 303 makes an IOSW indicating that fact, places it in PMEM 107 at a location associated with system 103(x) and generates an interrupt to CPU 105. If it is, uPS 303 places the memory address specified in IOCW 109 in the memory register of DAR 317 and places the kind of operation, the number of words to be transferred, and the receiving system in CSR 315.

uPS 303 next performs the DMA operation. First it sets the operation up by computing the size of the first packet to be transmitted and loading the word counters in DMACTL 339 and XSYS 323 with the number of words in the first packet. uPS 303 then starts the DMA operation, specifying the direction of transfer, which in this case, is from BUS 113 to XRAM 325. Under control of DMACTL 339, DAR 317 provides the address of the next word of data to be fetched to bus 113 while CSR 315 provides a read command. The data is fetched from PMEM 107 and goes via bus 113 and IOPB 309 to XRAM 325. As each word is fetched, the address counter in XRAM 325 is incremented and the word stored in XRAM 325's next location.

When the entire packet has been loaded into XRAM 325, uPS 303 begins the transmit operation. uPS 303 first makes a message word containing the HSL address of system 103(y) and the number of words in the packet (from XSYS 323's word counter) and loads the message word into XL 326. Then it checks again whether system 103(y) is still ready. If it is, loads RAD 348 with the address of system 103(y) and outputs control signals on DACTL 307 which specify the HSL address of 103(y) and cause XCTL 349 to lower REQ 205(x) and enable the logic in XCTL 349 which will seize HSL 101. In response to these signals, XCTL 349 proceeds as described in the operation of HSL 101 to first seize control of the bus, then transmit the message word and confirm that the proper system 103(y) is able to receive the data, and finally to transmit the data words of the packet. Transmission continues until it is terminated by an error or until the counter is XSYS 323 indicates that all words have been transmitted. At that point, XCTL 349 lowers the BUSY line as previously described and sends an interrupt to uPS 303 via DACTL 307. Status at the end of the transmission is contained in SB 341. If the transmission was not completed, the value in XSYS 323's data word counter informs uPS 303 how many words remain in XRAM 325. If there is more than one packet's worth of data, uPS 303 repeats the DMA and transmission operations just described. When the operation is complete, uPS 303 constructs an IOSW 111 indicating the status of the completed operation, places it at the proper location in PMEM 107, and generates an interrupt to CPU 105.

At the receiving end, HSL IOP 115(y) is enabled to received data when it has received a signal via DACTL 307 from uPS 303 indicating that RRAM 335 has been emptied, BUSY 209 is high, XCL(1) goes low, and the address of HSL IOP 115(y) appears on RA 207. RCTL 351 in HSL IOP 115(x) returns its address to the sender and sets ACK line 211 as previously described. If RRAM 335 is empty, RCTL 351 latches the message word into ML 336 in response to XCL(2). If RRAM 335 is not empty, RCTL 351 resets ACK line 211, causing the sender to terminate the transmission. On the third pulse of XCL 217, RCTL 351 begins strobing data words from data lines 219 into RRAM 335 in response to XCL 217. Each time a data word is strobed into RRAM 335, the address counter for RRAM 335 is incremented, so that the next word is stored at the next address. RCTL 351 continues strobing in data on each pulse of XCL 217 until BUSY 209 goes down, setting the signal which indicates that RRAM 335 is full and generating an interrupt in DACTL 307 to uPS 303. In response thereto, uPS 303 reads RSYS's address counter and ML 336 and compares the values to determine whether all of the words specified in the message word were in fact transferred.

The next step is reading the received data into PMEM 107 of system 103(y). On recept of an interrupt from DA 321 indicating that a packet of data has been received in RRAM 335, uPS 303 makes an IOSW 111 indicating system 103(x) from which the data was received and the number of data words in the packet. uPS 303 then stores the IOSW 111 into a location in PMEM 107 associated with system 103(x) and generates an interrupt to cpu 105. In response to the interrupt, CPU 105 examines IOSW 111, sets up an IOCW 109 for system 103(x) specifying a read operation, the number of data words given in IOSW 111, and the location in PMEM 107 to which the packet is to be transferred, and issues an SIO instruction specifying system 103(x) .

uPS 303 responds to the SIO instruction by setting up a DMA operation as previously described, except that in this case, the address in DAR 317 is the address in PMEM 107 to which the words are being transferred, the number of words is the number of words in the packet in RRAM 335, and the specified transfer is from RRAM 335 via IOPB 309, DAR 317, and BUS 113 to PMEM 107. When all of the data words have been transferred, uPS 303 again provides an IOSW 111 to PMEM 107 and resets the signal in DACTL 307 which inhibits HSL IOP 115 from receiving.

Figure 6:
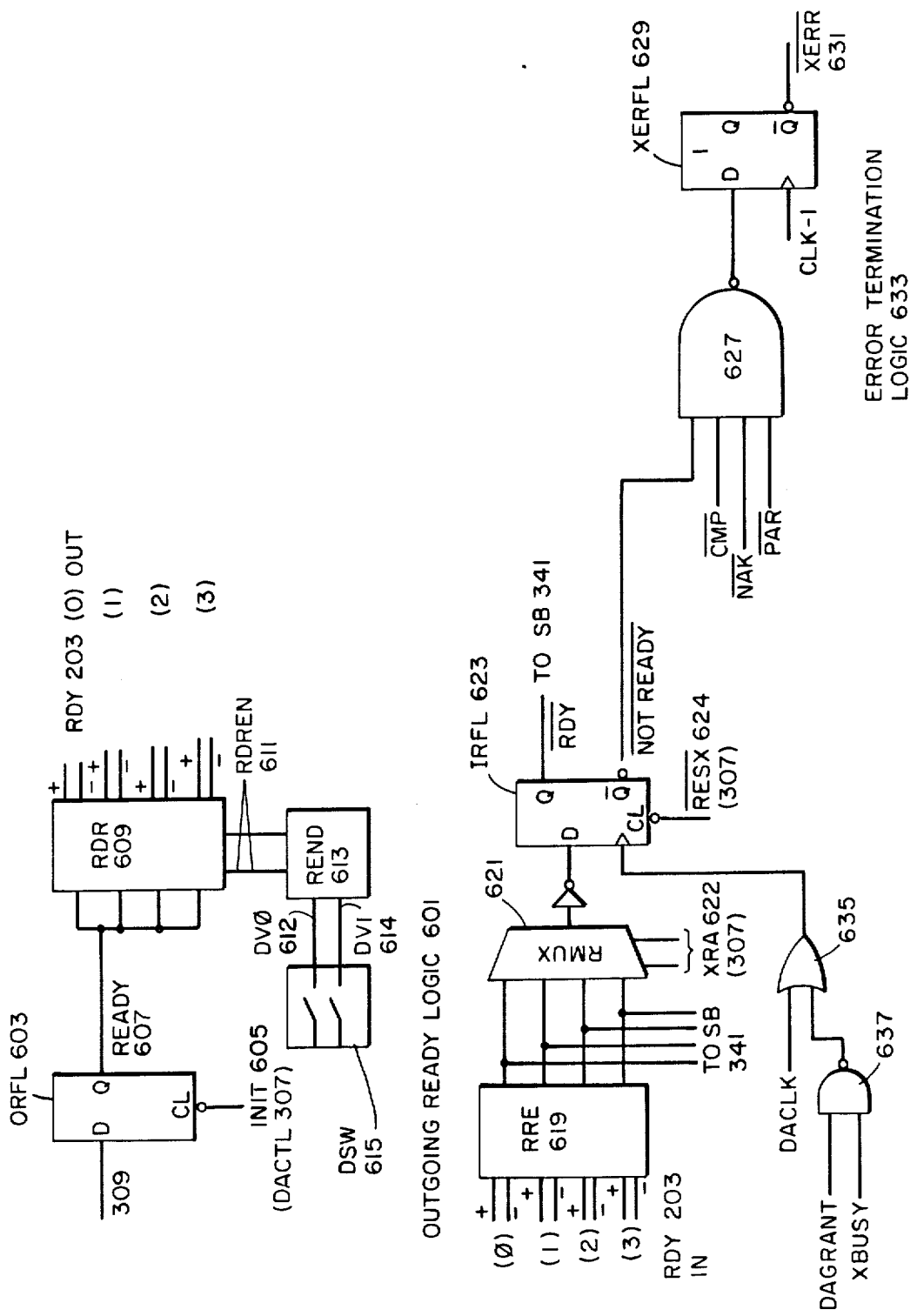
FIG. 6 is a detail of the logic controlling RDY lines 203 in the high-speed link.

6. Detail of Logic in RDYCTL 345: FIG. 6

As indicated in the discussion of RDY 203 above, RDYCTL 345 for a given HSL IOP 115(z) has two functions: to raise RDY 203(z) and to monitor the RDY 203 lines for the other systems 103. The logic implementing these functions in a preferred embodiment is shown in FIG. 6. Beginning with outgoing ready logic 601, that logic raises RDY 203(z) in response to an instruction received from uPS 303 on IOPB 309 when uPS 303 is initializing DA 321. The logic consists of outgoing ready flag (ORFL) 603, a latch whose input is connected to IOPB 309 and which is cleared in response to an initialization signal (INIT) 605 of DACTL 307. After uPS 303 has cleared ORFL 603, it sets the flag by means of an instruction on IOPB 309. Output from ORFL 603 forms the input for RDR 609, the driver for the differential pairs making up RDY 203(0..3). Which of RDY 203(0..3) is enabled is determined by RDREN lines 611, which are set by REND 613, a decoder, in response to two lines, DVO 612 and DV1 614 which carry the HSL address of system 103(z). These lines are connected to dip switches (DSW) 615 which are set when HSL IOP 115(z) is installed. Consequently, logic 601 only raises RDY 203(z).

Continuing with incoming ready logic 617, that logic consists of RRE 619, which is the receiver for the differential pairs making up RDU 203 in HSL 101. Lines carrying the signals from RDY 203(0..3) go to SB 341, where their values may be read by uPS 303, and to a mux, RMUX 621, which selects one of the four lines. Which one is selected to determined by XRA 622, two lines of DACTL 307 which carry the HSL address of the system 103 to which data is being transmitted. The selected line is input to a latch, IRFL 623, which is cleared by RESX 624, a signal of DACTL 307 which DA 321 receives when uPS 303 wishes to clear DA 321. IRFL 623's clock input is driven by DACLK, but as may be seen from OR gate 635 and NAND gate 637, DACLK is masked except when DAGRANT and XBUSY are both active, i.e., from the time when HSL IOP 115 has seized HSL 101 to the time when HSL IOP 115 ceases transmitting. If, during that period, the selected line of RDY 203 goes down, IRFL 623 is reset. Output from IRFL 623 goes to SB 341, where it is available to uPS 303, and to error termination logic 633.

Error termination logic receives inputs NOT NOT RDY, which is high unless RDY 203 from the selected receiver has not fallen, NOT CMP, which is high unless RRA failed to match XRA, NOT NAK, which is high unless ACK 211 was not raised at ACKS1 or had fallen at ACKS2, and NOT PAR, which is high unless a parity error has been detected. If any of these lines go low, NAND gate 627 sets the latch XRFL 629, whose output is the signal NOT XERR, which indicates a transmission error when it falls.

7. Detail of Logic Generating DACLK

Figure 7:
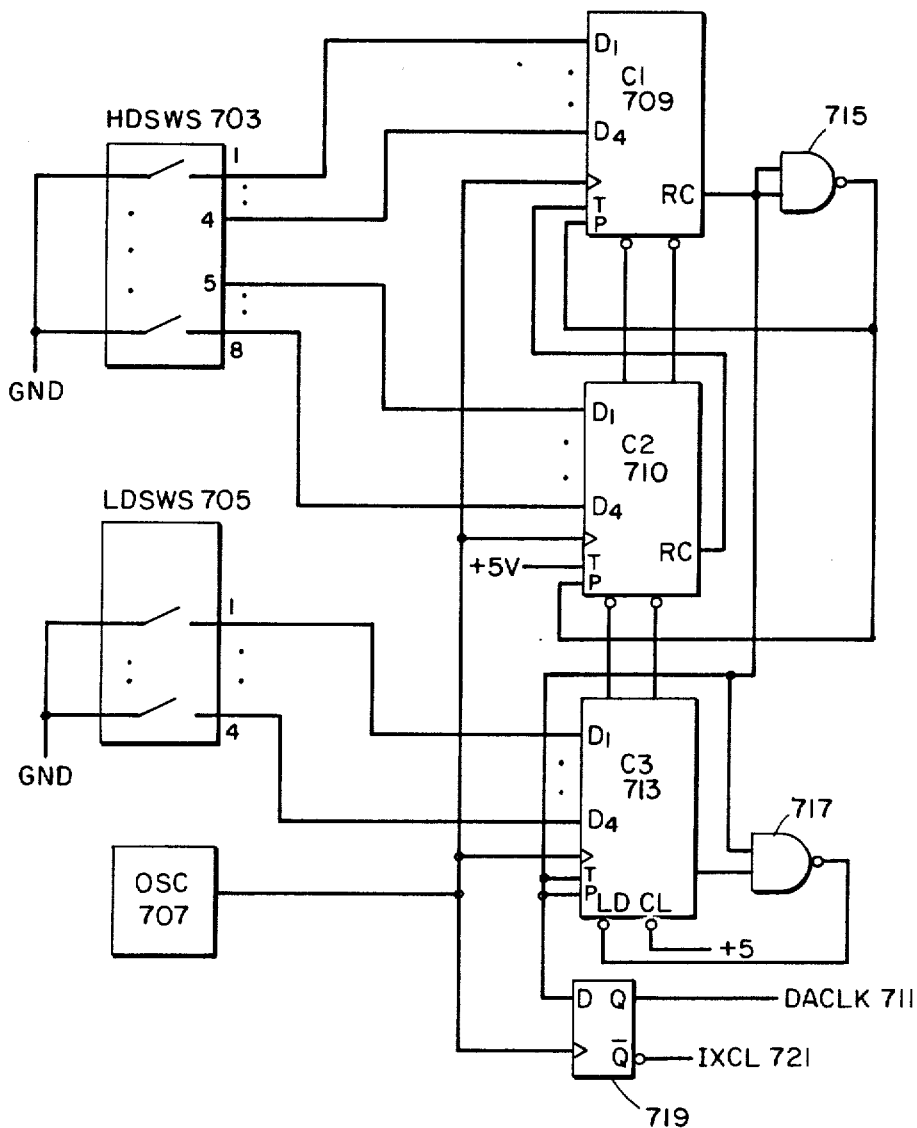
FIG. 7 is a detail of the logic generating clock signals in the high-speed link.

As previously explained, the period of DACLK, the clock signal which controls operation of XCTL 349 and from which XCL 217 is derived, can be adjusted to ensure that HSL addresses on RA 207 and the raising of BUSY 209 and PAR 213 and the raising and lowering of ACK 211 have time to propagate across HSL 101 and to overcome signal degradation resulting from increasing length of HSL 101. The logic generating DACLK is shown in FIG. 7. DACLK logic 701 has the following main components: high dip switches (HDSWS) 703, low dip switches (LDSWS) 705, oscillator (OSC) 707, binary counters C1 709, C2 710, and C3 713, and D latch 719. HDSWS 703 is a set of 8 dip switches whose settings determine the length of time during a clock interval that DACLK stays high. LDSWS 705 is a set of 4 dip switches whose settings determine the length of time during a clock interval that DACLK stays low. OSC 707 is a 20 MHz oscillator. C1 709, C2 710, and C3 713 are loadable 4-bit binary counters with ripple carry (RC). The T and P inputs control counting and the carry: both must be high to enable counting and T enables output on RC. When counting is enabled, the counters increment by 1 in response to the pulses generated by OSC 707. D latch 719 has as its outputs DACLK 711 and IXCL 721, the internal clock signal from which XCL 217 is derived. As may be seen from FIG. 7, DACLK 711 and IXCL 721 are complements of one another.

Operation of logic 701, beginning when C1 709 overflows, producing an output at RC, is as follows: When RC of C1 709 goes high, latch 719 is set and IXCL 711 goes low. At the same time, the output of NAND gate 715 goes low, inhibiting C1 709 and C2 710 from counting and enabling C3 713 for counting. As will be explained later, C3 has been loaded with a value obtained from the settings of LDSWS 705. C3 713 counts until it overflows. producing a signal at RC which, combined with the high output from RC of 709, produces a low output at NAND gate 717, which in turn causes C3 713 to be loaded from LDSWS 705 and C1 709 and C2 710 to be loaded with a value obtained from the setting of HDSWS 703. When C1 709 is loaded, RC in that counter goes low, the output of NAND 715 goes high, IXCL 721 goes high, and C2 710 begins counting. When C2 710 overflows, its RC output goes high, setting the T input of C1 709 high, and enabling C1 709 to begin counting. When C1 709 overflows, its RC output goes high, beginning the cycle again.

As can be seen from the above description, the settings of LDSWS 705 determine the time that IXCL 721 is low, while the settings of HDSWS 703 determine the time that it is high. In a preferred embodiment, IXCL 721 is high for 100 ns and low for 50 ns. In embodiments with longer HSLs 101, the time periods would be longer.

8. GRANT Logic 801

Figure 8:
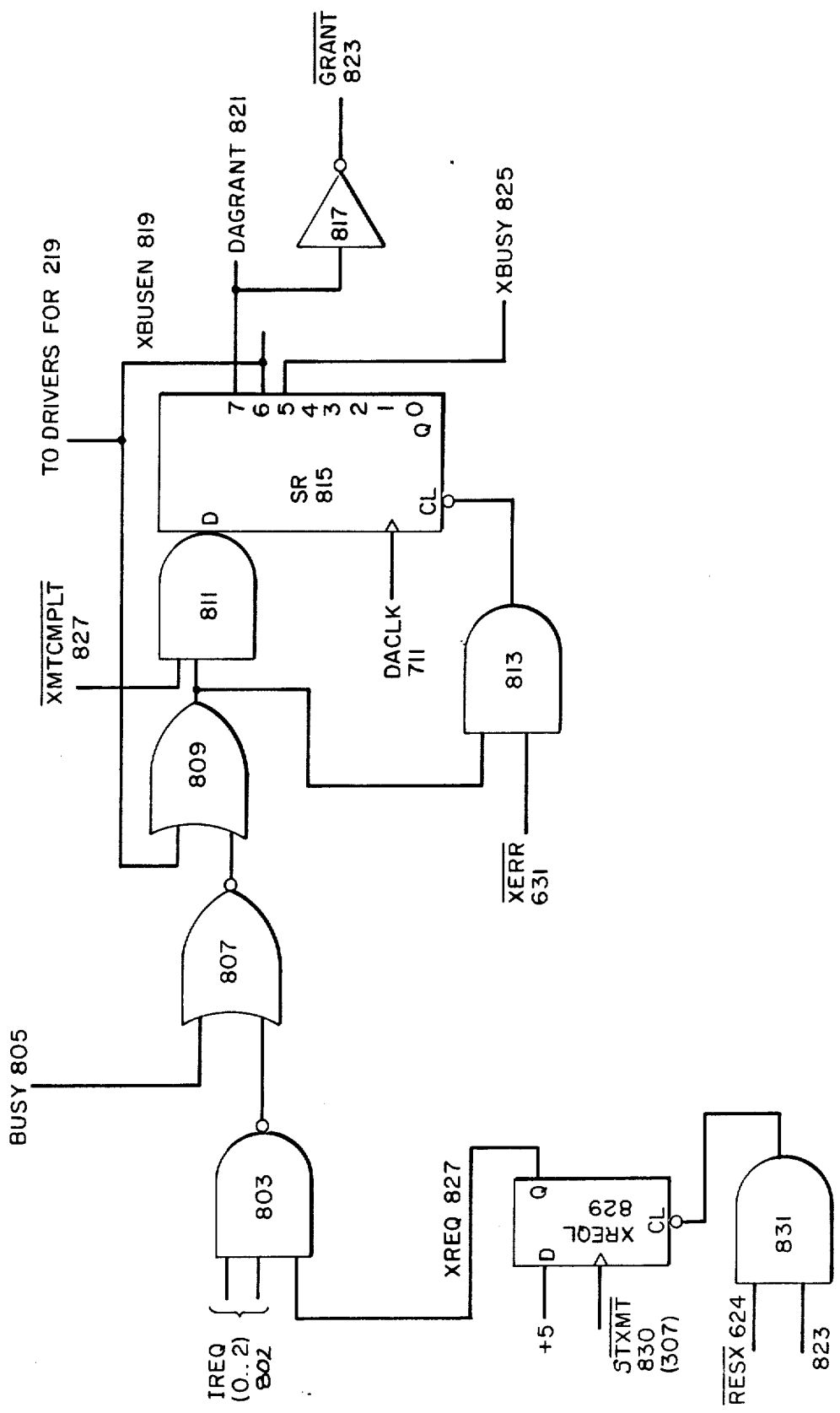
FIG. 8 is a detail of the bus arbitration logic in the high-speed link.

As explained in the discussion of operation of HSL 101, a given HSL IOP 115(z) may seize HSL 101 only if BUSY is low and no higher-priority HSL IOP 115(z) is requesting HSL 101. FIG. 8 shows GRANT logic 801, the bus mediation logic in HSL IOP 115(z). A key element in logic 801 is shift register (SR) 815, which receives single-bit inputs at its D input and then shifts the bits through SR 815. If a bit in a given position has a 1 value, the corresponding Q output of SR 815 is high. Shifting is done at the rate determined by DACLK 711. A low input at CL clears SR 815.

When HSL IOP(z) is ready to begin a transmittal, NOT RESX 624 of DACTL 307 is high. If HSL IOP 115(z) has not yet seized HSL 101, NOT GRANT 823 is high. Consequently, AND gate 831 has a high output, which enables transmit request latch (XREQL) 829. When uPS 303 has set up XRAM 325 and XL 326 as required for the transmittion, it raises NOT STXMT 830 of DACTL 307. In response to NOT STXMT, XREQL 829 sets itself, raising transmit request (XREQ) 827). This signal and IREQ (0..2) 802 serve as inputs to NAND gate 803. IREQ (0..2) are produced by logic responsive to DVO 612 and DV1 614, specifying HSL IOP 115(z)'s HSL address which enables the receivers only for those REQ 205 signals from HSL IOPs 115 having higher priorities than that of HSL IOP 115(z). Only if all of those REQ 205 signals are high, i.e., if no HSL IOP 115 with a higher priority is requesting and HSL IOP 115(z) is itself requesting does NAND gate 803 have a low output. Only in this case does NAND gate 803 provide a low output to NOR gate 807, which receives as its second input BUSY 805, which is connected to the receiver for BUSY 209. If BUSY 805 is low, indicating that HSL 101 is free and NOR gate 807 is receiving a low input from NAND 803, OR gate 809 and AND gate 811 receive high inputs. The output from OR gate 809 further goes to AND gate 813, where it serves to inhibit clearing of SR 815 as long as NOT XERR 631 indicates that there is no error in the transmission. If NOT XMTCMPLT 827 is high, indicating that the transmission for which the bus is sought is not complete (NOT XMTCMPLT 827 goes low when XSYS 323's word counter overflows), a 1 bit is loaded into SR 815 at every pulse of DACLK 711. Six pulses after the first 1 bit is loaded into SR 815, XBUSY 825, which is connected to the driver for BUSY 209, goes high. On the next pulse, XBUS EN 819 goes high, providing a high input to OR gate 809 and ensuring that 1 bits will be provided to SR 815 until NOT XMTCMPLT 827 indicates that the transmission is terminated. On the following pulse, DAGRANT 821 goes high, enabling the driver for BUSY 209, permitting output of XBUSY 825 and seizing HSL 101.

SR 815 continues to receive 1 inputs at D until NOT XMTCMPLT 827 signals completion of the transmission. When this occurs, SR 815 begins receiving 0 inputs. Consequently, 6 DACLK 711 pulses after a transmission is complete, XBUSY 825 goes low, freeing HSL 101. In the case of a transmission error, indicated by NOT XERR 631, SR 815 is cleared and XBUSY 825 goes low immediately.

Figure 9:
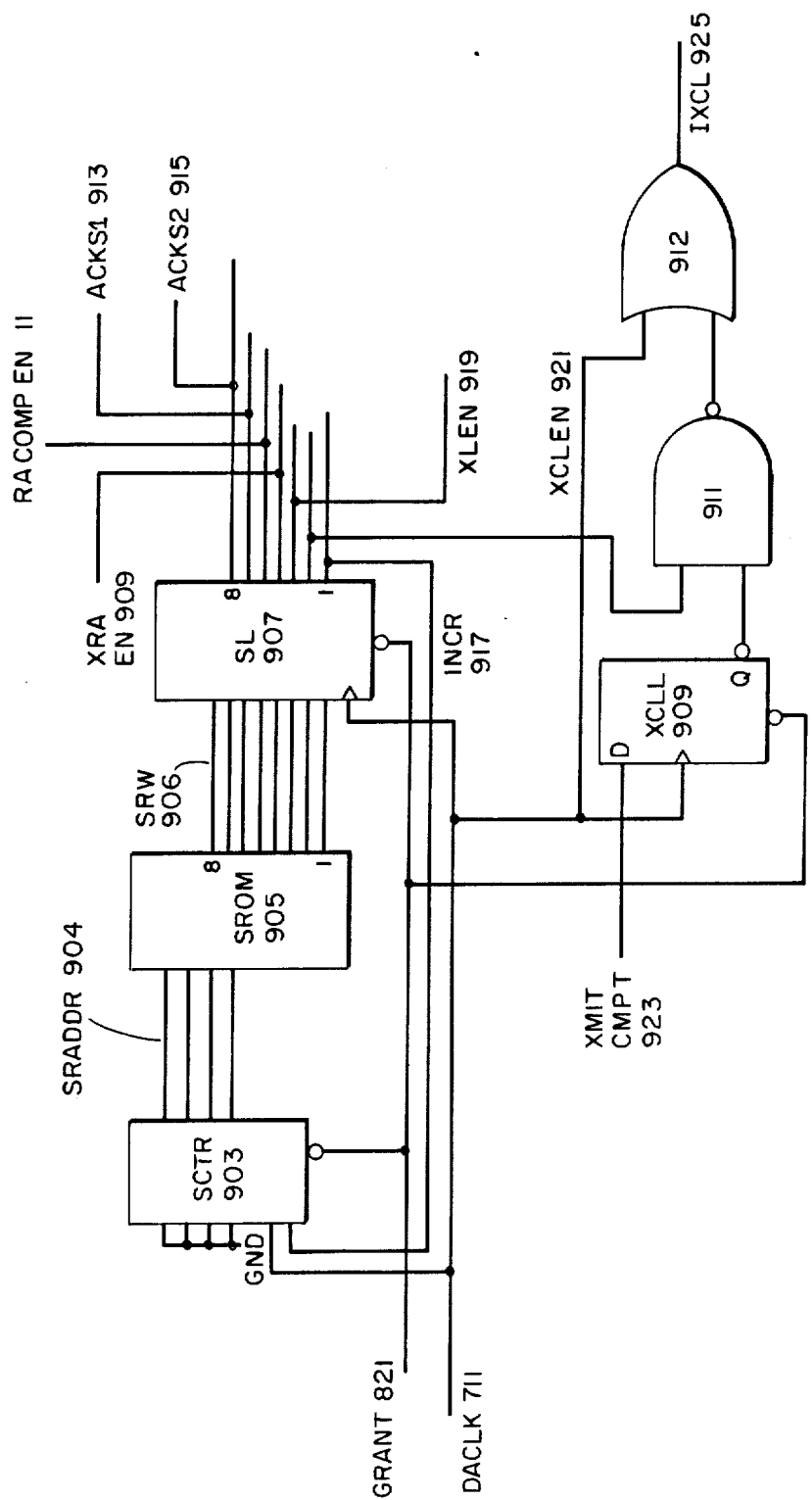
FIG. 9 is a detail of the sequencer logic controlling start of a data transmission in the high-speed link.

9. Logic Controlling XCLK 217 and Sampling of RA 207 and ACK 211: FIG. 9

As indicated in the discussion of operation of HSL 101, a transmitting HSL IOP 115 produces a first pulse on XCLK 217 and sends with it its own XRA on RA 207, pauses for five DACLK 711 pulses, then sends another XCLK pulse and a message word and samples ACK 211 and the returned RRA on RA 27, waits five more DACLK 711 pulses, again samples ACK 211, and if the receiving HSL IOP 115 can receive the data, waits two more DACLK 711 pulses and then begins producing an XCLK pulse and sending a data word with every DACLK 711 pulse. The above sequence of events is managed by sequencer logic 901, shown in FIG. 9.

The components of that logic are SCTR 903, a loadable binary counter, SROM 905, a read-only memory containing 8-bit words, and SL 907, a latch for receiving the words output from SROM 905. SCTR 903 increments its contents in response to DACLK 711 when enabled by INCR 917 and outputs its current value when enabled by DAGRANT 821. The value serves as an address (SRADDR 904) for SROM 905, which outputs a word (SRW 906) to SL 907 in response to SRADDR 904. When enabled by DAGRANT 821, SL 907 receives the current SRW 906 in response to DACLK 711 and outputs the current SRW 906 to 7 control lines. The control lines and their functions are the following:

- INCR 917 causes SCTR 903 to increment, providing the address of the next SRW in SROM 905.
- XCLKEN 921 enables output of IXCL 925, which in turn produces XCL 217 on HSL 101.
- XLEN 919 enables the address counter in XRAM 325 and enables output from XL 326 to data lines 219.
- XRA EN 909 enables output of XRA on RA 207.
- RACOMP EN 911 enables sampling of RRA on RA 207 and comparison with XRA.
- ACKS1 913 enables the first sampling of ACK 21.
- ACKS2 915 enables the second sampling of ACK 211.

The functions involved in beginning a data transmissio can thus be sequenced by loading SROM 905 with a sequence of SRWs 906 whose bits are set so that the proper signal lines will be high or low. For example, in a preferred embodiment, the first SRW 906 to be addressed by SCTR 903 contains 1s corresponding to the lines INCR 917 and XRA EN 909. Consequently, XRA is output on RA 207 and SCTR 903 is incremented, causing the next SRW 906 to be addressed. That word contains 1s corresponding to XRA EN 909, XCLEN 921, and INCR 917, and in consequence, XCL(1) is produced on XCL 217, XRA remains on RA 207, and the next SRW 906 is addressed. Continuing in this fashion, sequencer logic 901 causes transmitting HSL IOP 915 to perform the functions described in the discussion of operation of HSL 101. The last SRW 906 in SROM 905 to be executed raises XCLEN 921 and XLEN 921, thus permitting the first data word to be output from XL 326 and enabling the address counter in XSYS 323. Since INCR 917 is not raised, no further SRW 906 is output to SL 907 and sequencer logic 901 thus continues to execute the last instruction, causing the data words to be output from XRAM 325 to data lines 219.

As may be further seen in FIG. 8, the pulses carried by XCL 217 are produced from DACLK 711. Their output is enabled only when a SRW 906 in SL 907 raises XCLEN 921 and XMIT CMPT 923, a signal which rises when the data word counter in XSYS 323 overflows, is high. The logic is the following: XMIT CMPT serves as the input to XCL latch (XCLL) 909, which is enabled by DAGRANT 821 and latches in the current value of XMIT CMPT 923 in response to DACLK 711. Thus, after HSL 101 has been seized and until the transmission is complete, the NOT Q output of XCL 909 is high. That output and XCLEN 921 serve as inputs to NAND gate 911, and consequently, the output of that gate is high except when XMIT CMP 923 and XCLEN 921 are both high, i.e., when a transmission is going on and a pulse is to be produced on XCL 217. The output of NAND gate 911, together with DACLK 711, serve as the inputs to OR gate 912, which generates IXCL 925, which in turn is connected to the driver for XCL 217. As shown in FIGS. 4 and 5, XCL 217 clock pulses are produced when XCL 217 goes low. Output from OR gate 912 goes low only when the output of gate 911 is low and DACLK 711 goes low, i.e., only when XMIT CMPT 923 is low and XCLEN 921 is high.

Figure 10:
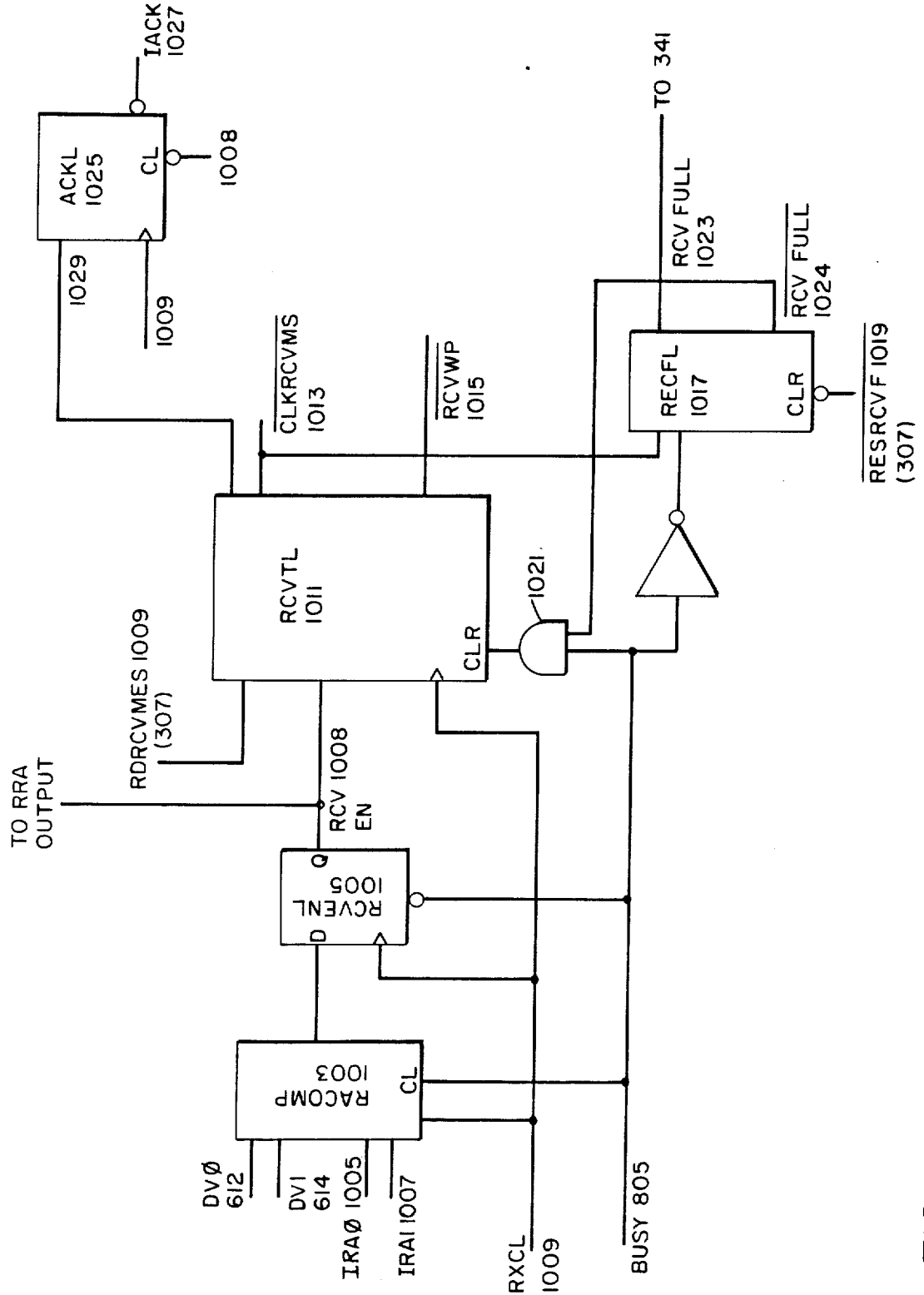
FIG. 10 is a detail of the logic controlling start of reception of data in the high-speed link.

10. Logic Controlling Reception of Data: FIG. 10

The interaction of receiving HSL IOP 115(y) with HSL 101 previously described is produced by receive logic 1001, shown in FIG. 10. Logic 1001 performs the following functions:

- It inhibits reception until uPS 303 has performed a DMA operation emptying RRAM 335;
- When BUSY 209 is active, it compares the HSL address received on RA 207 with the HSL address of IOP 115(y) and if they are the same, responds to the proper HSL address on RA 207 and to an active BUSY 209 by enabling reception and outputting its own HSL address on RA 207;
- It provides timing signals derived from XCL 217 as required to strobe the message word into ML 336 and to increment RRAM 335's address counter and strobe the data words into RRAM 335.
- It raises and lowers ACK 211 as required by the results of the comparison of HSL addresses and the condition of RRAM 335.

The main components of logic 1001 are RACOMP 1003, which compares XRA with the HSL address of IOP 115(y), receive enable logic (RCVENL) 1005, which generates RCV EN 1007, the signal which enables IOP 115(y) to begin receiving data, receive timing logic (RCVTL) 1011, which provides pulses of XCL 217 to RSYS 337, ACK logic (ACKL) 1025, which controls ACK 211, and receive full logic (RECFL) 1017, which inhibits IOP 115(y) from receiving further data before uPS 303 has emptied RRAM 335.

Beginning with RECFL 1017, that logic generates a signal RCV FULL 1023 upon termination of any transmission which resulted in a portion of a packet being received in IOP 115(y). When RCV FULL 1023 is set, RCVTL 1011 resets ACKL 1025 in response to XCL(2). Two events are required to set RCV full: the reception of NOT CLKRCVMS 1013 in RECFL, indicating that the packet's message word has been received, and BUSY 805 going down, indicating that the transmission has been terminated. Once set, RCV FULL 1023 is cleared by NOT RESRCVF 1019, a signal of DACTL 307 which uPS 303 produces after it has performed a DMA operation which empties RRAM 335. Thus, until this occurs, RECFL 1017 generates RCV FULL 1023, keeping ACK 211 low. After NOT RESRCF has been asserted, NOT RCVFULL 1024 goes high, enabling RCVTL 1011 when BUSY 805 is asserted.

Continuing with RACOMP 1003 and RCVENL 1005, RACOMP 1003 and RCVENL 1005 are enabled when BUSY 805 goes high. When RXCL 1009, connected to the receiver for XCL 217, receives XCL(1), the result of a comparison between RRA, received on IRA0 1005 and IRA1 1007, and the HSL address of IOP 115(y), received on DV0 612 and DV1 614 from dip switches DSW 615, is latched into RCVENL. If XRA and the HSL address are the same, RCVEN 1008 is asserted. RCVEN 1008 enables the drivers for RA 207, ACK 211, and PAR 213, thereby permitting output of RRA and the signals on ACK 211 and PAR 213 to which the transmitting IOP 115(x) responds while initiating and carrying out the transmission. RCVEN 1008 further enables RCVTL 1011 to commence operation.

As previously mentioned, RCVTL 1011 is cleared when both BUSY 805 and NOT RCVGFULL 1024 are asserted and then produces NOT CLKRCVMS 1013 in response to XCL(2), the first pulse received in RXL 1009 following the assertion of RCVEN 1008. ML 336 responds to NOT CLKRCVMS by latching the message word into ML 336. From the next (XCL(3)) and following pulses on RXCL 1009 RCVCTL generates NOT RCVWP 1015, which increments the address counter in RSYS 337 and clocks data words into RRAM 335. Additionally, RCVTL 1011 produces NOT CLKRCVMS 1013 in response to NOT RDRCVMES 1009, a signal of DACTL 307 by which uPS 303 reads ML 336.

ACKL 1025, finally, produces IACK 1027, which is connected to the driver for ACK 211. ACKL 1025 is cleared when RCV EN 1008 goes low and enabled when RCV EN 1008 goes high in response to XCL(1) on RXCL 1009. At that point, IACK 1027 is high. If RCV FULL 1023 is asserted, NOT RCV FULL 1024 is not asserted at AND gate 1021, and RCVTL 1011 is cleared, resetting line 1029 and causing IACK 1027 to go low in response to XCL(2) on RXCL 1009.

11. Parity Logic

The logic used to generate DP 215 in transmitting IAP 115(x) is standard parity generation logic which receives D 201(0..15) as its inputs and generates an odd parity result, which is provided to the transmitter for DP 215. In receiving IAP 115(y), D 201(0..15) are connected to parity checking logic which also receives DP 215. If the parity of the word received on D 201(0..15) is different from that indicated by DP 215, an error signal is generated which RXCL 1009 strobes into a latch. The output of the latch is connected to the driver for PAR 213. The latch is reset by a reset signal of DACTL 307 from uPS 303.

12. Conclusion

The foregoing disclosure has shown how a novel high-speed link for connecting peer systems may be constructed and operated. The disclosure has included a detailed description of a presently-preferred embodiment of the high-speed link and of its use to connect peer VS computer systems manufactured by Wang Laboratories, Inc. As will be clear to those skilled in the art, the invention may be employed to connect computer systems of other types and there may be other embodiments of the logic which controls operation of the high-speed link. Further, the logic levels of lines may be reversed and protocols may be modified without departing from the spirit of the high-speed link disclosed herein. Moreover, the high-speed link may maintain its basic form while connecting a greater or lesser number of peer systems and providing for the transfer of data words having more or fewer bits than those transferred in the present implementation. The preferred embodiment described herein is thus to be considered in all respects as illustrative and not restrictive, the scope of the invention being indicated by the appended claims rather than the foregoing description, and all changes which come within the meaning and range of equivalency of the claims are intended to be embraced therein.

What is claimed is:

1. In a system including a plurality of peer component systems, each one of which includes an input-output system, a high-speed link for transferring data between the component systems via the input-output systems comprising:

connecting means connecting an input-output system in each of the component systems and including a plurality of data lines and a plurality of control lines, the control lines including:
  a plurality of system status lines for making a ready/not ready status of each input-output system connected to the connecting means continually available to all other connected input-output systems,
  a plurality of arbitration lines for indicating whether the high speed link is currently in use and which of the input-output systems currently wishes to commence transmission of data on the high-speed link, and
  a plurality of receiver acquisition lines for specifying which of the input-output systems is to receive the transmission, indicating that the receiving input-output system has acknowledged the specification, and indicating whether the receiving input-output system is presently able to accomodate data and
means in each input-output system connected to the connecting means and including:
  system status detection means connected to the system status lines for inhibiting transmission of data to any connected input-output system having a not ready status,
  arbitration means connected to the arbitration lines for determining therefrom whether the input-output system may have access to the link at any given time, and
  receiver acquisition determination means connected to the receiver acquisition lines whereby a transmitting input-output system may specify a receiving input-output system, the receiving input-output system may acknowledge its selection and ability to accomodate data, and the transmitting input system may verify that the specified input-output system has been selected and is able to accomodate data, data providing means in the transmitting input-output system responsive to the receiver acquisition determination means and to the system status detection means for providing data to the data lines, and data receiving means responsive to the receiving acquisition determination means in the receiving input-output system for receiving data from the data lines.

2. The high-speed link as set forth in claim 1 and wherein:

the receiver acquisition lines include a plurality of receiver address lines for carrying a receiver address specifying the receiving input-output system;

the receiver acquisition determination means in the transmitting input-output system places a receiver address on the receiver address lines and causes the data providing means to terminate transmission if it does not receive the same receiver address on the receiver address lines; and the receiver acquisition determination means in the receiving input-output system responds to the receiver address received from the transmitting input-output system by placing its own receiver address on the receiver address lines.

3. The high-speed link as set forth in claim 2 and wherein:

the receiver acquisition lines further include an acknowledge line;

the receiver acquisition determination means in the receiving input-output system further responds to the receiver address by producing an acknowledge signal on the acknowledge line and if the receiving input-output system is presently able to accomodate data, continuing to produce the acknowledge signal but otherwise ceasing to produce the acknowledge signal; and the receiver acquisition determination means in the transmitting input-output system causes the data providing means to cease providing data if the receiving system ceases to produce the acknowledge signal.

4. The high-speed link as set forth in claim 3 and wherein:

the system status detection means in the transmitting input-output system causes the data providing means to cease providing data if the system status line for the receiving input-output system begins to indicate the not ready status during transmission.

5. The high-speed link as set forth in claim 1 and wherein:

the receiver acquisition lines include an acknowledge line; the receiver acquisition determination means in the receiving input-output system further responds to the specification of the receiving input-output system on the receiver acquisition lines by producing an acknowledge signal on the acknowledge line and if the receiving input-output system is presently able to accomodate data, continuing to produce the acknowledge signal but otherwise ceasing to produce the acknowledge signal; and the receiver acquisition determination means in the transmitting input-output system causes the data providing means to cease providing data if the receiving system ceases to produce the acknowledge signal.

6. The high-speed link as set forth in claim 1 and wherein:

the system status detection means in the transmitting input-output system causes the data providing means to cease providing data if the system status line for the receiving input-output system begins to indicate the not ready status during transmission.

* * * * *